(12) United States Patent
Shoup

(10) Patent No.: US 6,321,667 B1
(45) Date of Patent: Nov. 27, 2001

(54) ADJUSTABLE GAUGE WHEEL FOR A PLANTER

(76) Inventor: Kenneth E. Shoup, 17649 Richmond, Plainfield, IL (US) 60544

( * ) Notice: Subject to any disclaimer, the term of this patent is extended or adjusted under 35 U.S.C. 154(b) by 0 days.

(21) Appl. No.: 09/590,490

(22) Filed: Jun. 9, 2000

(51) Int. Cl.$^7$ ..................................................... A01C 5/06
(52) U.S. Cl. ......................... 111/137; 111/164; 172/536; 172/736
(58) Field of Search ............................. 111/137, 52, 140, 111/134, 157, 167, 163, 164; 172/536

(56) References Cited

U.S. PATENT DOCUMENTS

| | | | |
|---|---|---|---|
| 4,009,668 | * 3/1977 | Brass et al. | 111/137 |
| 5,427,038 | * 6/1995 | Ege | 111/137 |
| 5,595,130 | * 1/1997 | Baugher et al. | 111/52 |
| 5,802,995 | * 9/1998 | Baugher et al. | 111/52 |

\* cited by examiner

Primary Examiner—Christopher J. Novosad
(74) Attorney, Agent, or Firm—Emrich & Dithmar

(57) ABSTRACT

An agricultural planting machine having a frame, a pair of opposite furrow forming disks rotatably mounted on the frame on intersecting axes and a pair of gauge wheel assemblies mounted on the frame respectively adjacent the opposite sides of the pair of furrow forming disks. An improved mechanism for adjustably mounting the other end of each gauge wheel arm which has an internally threaded bore to the frame includes an internally threaded cylindrical shaft mounted on the frame. An externally threaded bushing is rotatably mounted on the shaft for engagement with the internally threaded bore in the gauge wheel arm such that rotation of the bushing with respect to the gauge wheel arm moves the gauge wheel arm axially of the internally threaded cylindrical shaft to adjust the lateral spacing of the gauge wheel from the adjacent disk. A locking member locks the externally threaded bushing to the other end of the gauge wheel arm to cause rotation of the bushing and the arm as a unit. Axial adjustment of the gauge wheel arm relative to the furrow forming disks is provided by movement of the locking member relative to the externally threaded bushing.

13 Claims, 3 Drawing Sheets

ADJUSTABLE GAUGE WHEEL FOR A PLANTER

BACKGROUND OF THE INVENTION

This invention relates to an agricultural planting machine and more particularly to a planting machine having a pair of rotating disks that open a furrow in which the seeds are deposited as the machine advances and a pair of gauge wheels on opposite sides of the furrow opening disks that control the depth of the furrow opened by the disks. A machine of the above general type is shown in U.S. Pat. No. 4,111,137 and U.S. Pat. No. 5,111,137, both of which are owned by Deere & Co.

In such a machine, it is desirable to have the gauge wheels positioned on the opposite sides of the furrow opening disk in a close relationship to accurately gauge the depth of the furrow and to prevent the build-up of dirt or trash between the gauge wheels and the opener disks. Due to the wear of the machine, it is sometimes necessary to adjust the position of the gauge wheels to maintain the close relationship of the wheels with the opening disks. For that purpose, it is known to provide shims or spacer washers on the opposite side of the arm that rotatably supports the gauge wheels, the upper end of the arm being mounted on a generally transverse shaft so that the lateral position of the gauge wheel relative to the adjacent disk can be adjusted by removing the bolt that holds the gauge wheel arm until the desired minimum clearance between the gauge wheel and the side of the furrow opening disk is achieved. The above procedure, of course, may be somewhat difficult and time consuming, since to make the adjustment, the gauge wheel arm and the gauge wheel mounted thereon must be removed to add or subtract the washers or shims.

The device illustrated in the above-mentioned Ege patent also provides for axial adjustment of the gauge wheel. The device there described is perfectly adequate for its intended purpose but does put substantial forces on the bearing on which is mounted the gauge wheel. In order to avoid excessive wear on the bearing, while retaining the ease of adjustment inherent in the Ege device, the present invention is directed to a device for axially adjusting the position of the gauge wheels, that is laterally adjusting the gauge wheels in connection with the adjacent furrow opening devices while alleviating excessive wear on the bearings by locking the bearing to the gauge wheel arm so that the arm and bearing react as a unit.

SUMMARY OF THE INVENTION

According to the present invention, an improved mechanism is provided for adjusting the position of the gauge wheel relative to the furrow opening disk. More specifically, an exteriorly threaded bushing is interposed between the gauge wheel arm and the shaft the arm having an internal thread that engages the external thread on the bushing. The bushing is locked to the arm, and when unlocked, the position of the gauge wheel relative to the furrow opening disks is easily adjusted by simply rotating the bushing until the gauge wheel achieves its desired position, after which the bushing can again be locked to the arm to hold the position of the gauge wheel in the desired location.

An important feature of the invention resides in its simple inexpensive construction. Another important feature of the invention resides in the fact that the adjustment can be easily accomplished in the field with a minimum amount of tools, so that the operator is not discouraged from adjusting the relationship between the furrow opening disks and gauge wheel to its optimum position.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
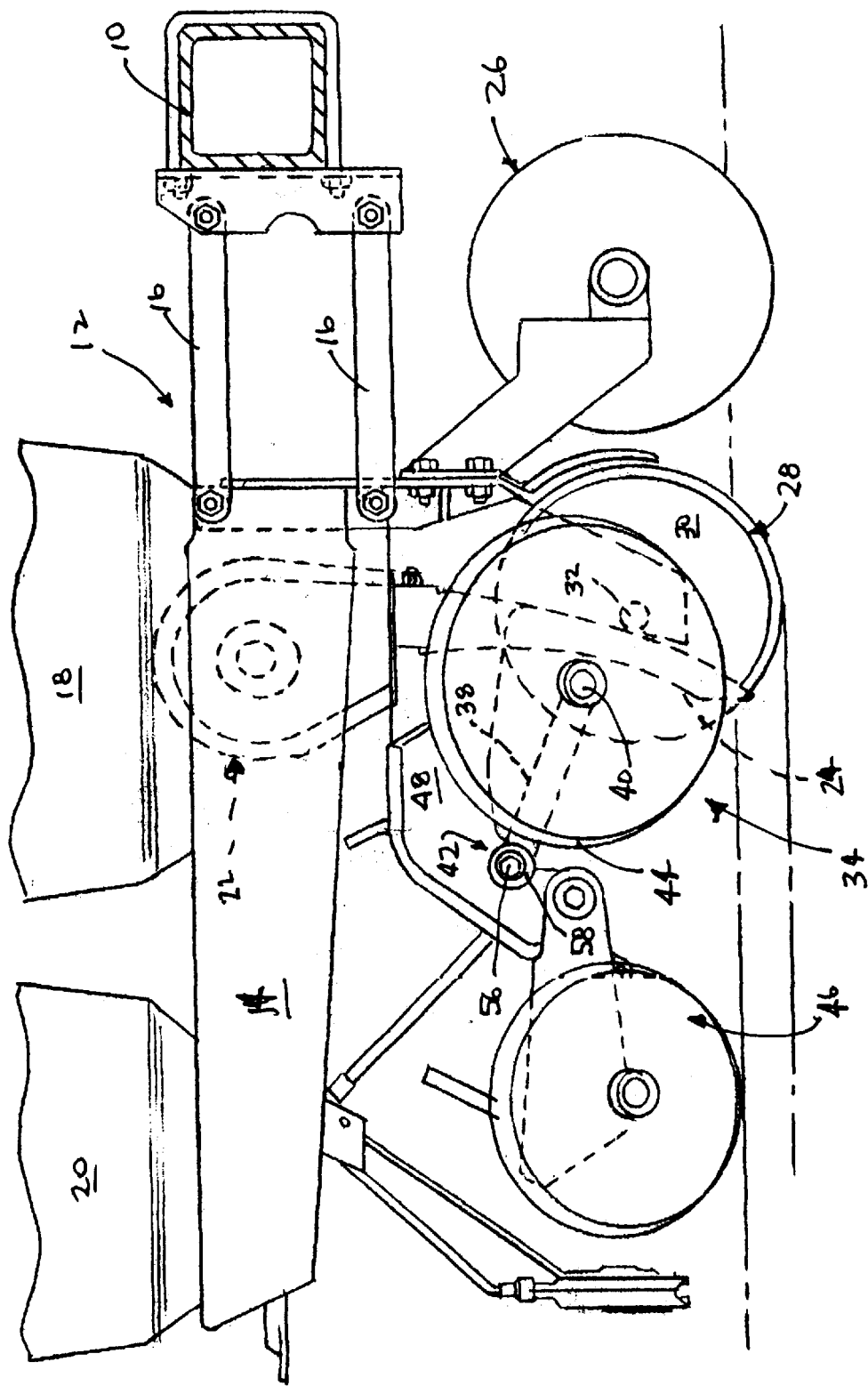
FIG. 1 is a schematic side elevation view of one row unit of a planter embodying the invention.

The invention is embodied in an agricultural planter having a mobile main frame 10, only a portion of which is illustrated in FIG. 1. As is well known, frame 10 is conventionally attached to and towed by a tractor, and a number of individual row units, indicated generally by the numeral 12, are spaced at intervals along the main frame 10. Each row unit 12 includes a row unit frame, indicated in its entirety by the numeral 14, the row unit frame of each row unit being independently vertically adjustable relative to the main frame by a pair of fore and aft links 16. Each row unit 12 may include a seed hopper 18 and a fertilizer hopper 20, as is well known. Only a single row unit 12 is shown and described herein, and, as is conventional, each row unit includes a seed selection mechanism 22 that receives seed from the seed hopper 18 and discharges them downwardly through a seed tube 24 at regular intervals.

A tillage device 26 is mounted on the row unit frame forwardly of a furrow opening device, indicated in its entirety by the numeral 28. The furrow opening device 28 comprises a pair of generally vertical disks 30 that rotate on generally horizontal transverse shafts 32. The axes of the respective disks 30 are slightly inclined relative to one another so that the disks contact one another forwardly and below the disk axes. In operation, the lower portion of the furrow opening disks 30 are disposed below ground level so that the disks form a V-shaped groove or furrow as the machine advances. All the above is described in greater detail in U.S. Pat. No. 4,009,668. As is apparent, the seed tube 24 deposits the seed in the furrow behind the axis of the furrow opening disks 30.

Figure 2:
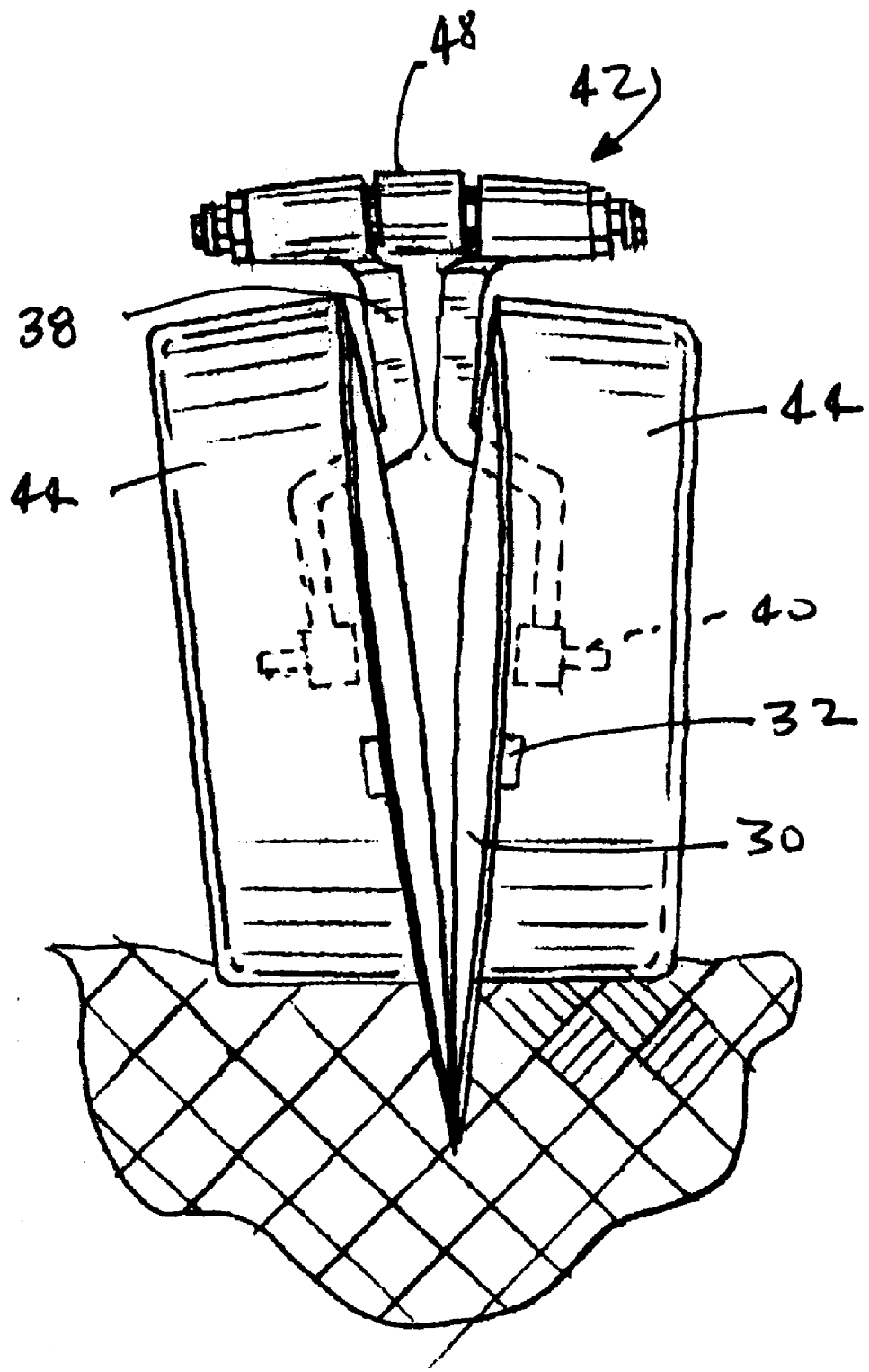
FIG. 2 is a schematic front view of the furrow opening disk and adjacent gauge wheels in an operating position.
Figure 3:
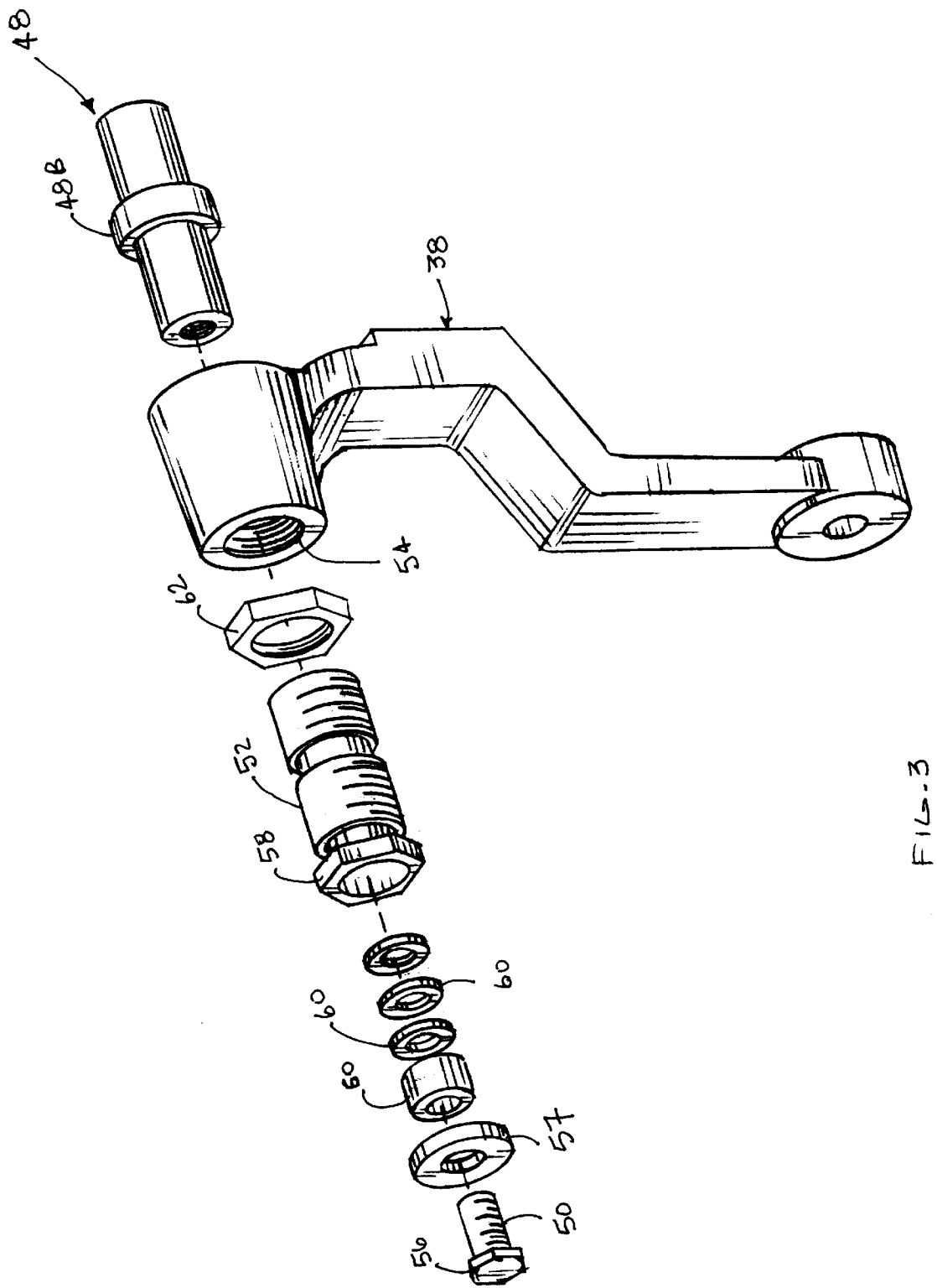
FIG. 3 is an enlarged exploded view of the adjusting mechanism for one of the gauge wheels.

A gauge wheel assembly, indicated in its entirety by the numeral 34 is mounted on the row unit frame 14 adjacent the furrow opening device 28 and includes a pair of gauge wheels 36 respectively disposed adjacent the outer sides of the furrow opening disks 30. The gauge wheels 36 are respectively mounted at the lower ends of upperwardly and rearwardly inclined arms 38 via shafts 40 that rotatably support the respective gauge wheels. The upper ends of the arms 38 are connected to the row unit frame 14 by means of an upper arm mounting structure indicated generally by the numeral 42, which includes an internally threaded bore 54 in the upper portion of each gauge wheel arm. The gauge wheels 36 are conventionally provided with rubber tires 44 around their periphery, and the tires present a relatively flat ground engaging surface. As is apparent, the axes of the gauge wheels shafts 40 are generally parallel to the axes of the adjacent furrow opening disk shafts 32, the shafts 40 being spaced rearwardly of the shafts 32. As is well known, an adjustable stop (not shown) operates between the row unit frame 14 and the gauge wheel arm 38 to limit the upward movement of the gauge wheel 36 relative to the frame. Since the gauge wheels 36 ride on the surface of the ground when the machine is in operation, the vertical position of the gauge wheels relative to the disks 30 controls the depth of the furrow opening by the disks, as best seen in FIG. 2. The inner edges of the gauge wheel tires 44 lightly engage or are very closely spaced from the outer side of the adjacent furrow opening disks 30, adjacent to the point where the disks leave the ground rearwardly of the disk shafts 32 but forwardly of the gauge wheel shafts 40. The close spacing of the gauge wheel tire 44 to the outer surface of the disk 30 cleans the disk and prevents the buildup of trash and dirt between the gauge wheel 36 and the disk. The close spacing of the gauge wheel 36 to the furrow opening device 28 also accurately gauges the depth of the furrow formed by the furrow opening device. A furrow closure mechanism 46 is also mounted on the row unit frame 14 immediately behind the gauge wheel assembly.

The gauge wheel mounting structure 42 includes a center support in the form of an internally threaded shaft 48 having an abutment surface 48A and shoulder 48B extending therearound, all of which is standard in the art and which is attached to the row unit frame 14. A pair of bolts 50, externally threaded and each being provided with a normal hex head 56 are threadedly received in the internally threaded shaft 48 connected to the frame 14. The bolts 50 as well as the internally threaded shafts 48 are inclined slightly downwardly from the frame 14 so that the axis of each bolt 50 is generally parallel to the axis of the respective gauge wheel mounting shaft 40 at the lower end of each gauge wheel arm 38. An externally threaded bushing 52 having a hex end 58 is threadedly received in the internally threaded portion or bore 54 of the gauge wheel arm 38. A lock mechanism in the form of a lock nut 62 which is internally threaded is rotatably mounted on the outside of the externally threaded bushing 52 and serves to locate the bushing 52 axially of the gauge wheel arm 38 and more particularly axially of the internally threaded bore 54. The end of the externally threaded bushing 52 opposite the hex head 58 abuts the shoulder 48B of the internally threaded shaft 48.

Thus, the bushing 52 when threaded with the bore 54 of the gauge wheel arm 38 causes the arm 38 and the bushing 52 to rotate as a unit, thereby dissipating the forces over the entire combination of bushing and gauge wheel arm as forces are generated during use. The bushing 52 and gauge wheel arm 38 are mounted to the frame 14 and internally threaded shaft 48 connected thereto by the bolt 50. A large washer 57 is positioned so as to prevent the bolt head 56 from sliding through the hollow portion of the hex head portion 58 of the externally threaded bushing 52. There are also provided a plurality of spacers 58 and 60 of various thicknesses which serve to accommodate the different lengths of the shaft 48 provided by different manufacturers. That is, the bolt 56 has to be tightened so that the spacers 58 and/or 60 contact the abutment surface 48A of the shaft 48 and are drawn there against by the bolt 50 when it is threadably engaged in the internally threaded shaft 48. Because various manufacturers make the shafts 48 in various lengths, the spacers are needed to accommodate this difference in manufacturers.

Thus, the lateral position of the upper end of the gauge wheel arm 38 having the bore 54 therein and consequently the position of the gauge wheel 36 relative to the furrow opening disks 30 can be readily adjusted by simply loosening the lock nut 62 on the bushing 52 and thereafter rotating the bushing in either direction and to adjust the wheels 44 to a new position. Thereafter, the lock nut 62 is again used to lock the bushing in its new position.

Because of the forces generated during use, there has been a tendency for certain of the parts in the gauge wheel arm adjusting mechanism to fail. Using a combination of the bushing 52, lock nut 62 and internally threaded portion 54 of the gauge wheel arm 38 as a single unit, alleviates the problem heretofore encountered in the use of the gauge wheel adjusting mechanisms previously supplied in the art.

In order to supply the aftermarket in the agricultural field, it is desirable to sell a kit comprised of gauge wheel arm 38, a large washer 57, an externally threaded bolt 50, a plurality of spacers such as spacer 58 and spacer 60, thereby enabling the farmer to change gauge wheel arms and adjusting mechanisms as needed.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. In an agricultural planting machine having a frame, a pair of opposite furrow forming disks rotatably mounted on the frame on intersecting axes so that the disks diverge upwardly from a point of contact below the axes of the disks, and a pair of gauge wheel assemblies mounted on the frame respectively adjacent the opposite sides of the pair of furrow forming disks, each gauge wheel assembly including a gauge wheel journalled on one end of a gauge wheel arm for rotation about an axis rearwardly of and generally parallel to the axis of the adjacent disks, an improved means for adjustably mounting the other end of each gauge wheel arm which has an internally threaded bore to the frame and comprising: an internally threaded cylindrical shaft mounted on the frame and having an axis generally parallel to the axis of the gauge wheel; an externally threaded bushing rotatably mounted on the shaft for engagement with the internally threaded bore in the gauge wheel arm; rotation of the bushing with respect to the gauge wheel arm moving the gauge wheel arm axially of the internally threaded cylindrical shaft to adjust the lateral spacing of the gauge wheel from the adjacent disk; a locking member locking the externally threaded bushing to the other end of the gauge wheel arm to cause rotation of the bushing and the arm as a unit; a connector having an externally threaded shank and a head, said shank extending through said bushing and the internally threaded bore in the gauge wheel arm into said internally threaded shaft to mount the gauge wheel arm to the shaft and the frame; axial adjustment of the gauge wheel arm relative to the furrow forming disks being provided by movement of said locking member relative to said externally threaded bushing; and at least one spacer between the end of the internally threaded shaft and the head of the externally threaded connector to accommodate variations in the length of the shaft.

2. The device of claim 1, wherein said locking member is a hex head nut.

3. The device of claim 1, wherein the spacer is a plurality of shim washers.

4. The device of claim 1, wherein one end of said externally threaded bushing has a hex head fitting thereon.

5. The device of claim 4, the diameter of said hex head fitting is substantially equal in diameter to a washer mounted between said housing and the head of the connector.

6. The device of claim 5, wherein said locking member is a hex head nut having the same diameter as said hex head fitting on said bushing.

7. A kit for an improved gauge wheel adjusting mechanism, said kit comprising: a gauge wheel arm having one end apertured to receive a gauge wheel and another and having an internally threaded bore, an externally threaded bushing for threaded engagement with said internally threaded bore in said gauge wheel arm, a locking member for maintaining said externally threaded bushing in a fixed axial position when said bushing is positioned within said internally threaded bore, an externally threaded bolt having a head and a shank, said bolt slidable with respect to said bushing, mechanism preventing said head of said bolt from sliding into said bushing, and shims mountable on said bolt shank for occupying the distance between said bolt head and an internally threaded shaft mounted to an agricultural implement frame receiving said externally threaded bolt and supporting said externally threaded bushing and said gauge wheel arm mounted thereto.

8. The kit of claim 7, wherein said locking member is a hex head nut.

9. The kit of claim 8, wherein the shims are washers having a plurality of thicknesses.

10. The kit of claim 9, wherein one end of said externally threaded bushing has a hex head fitting thereon.

11. The kit of claim 10, wherein the diameter of said hex head fitting is substantially equal in diameter to a washer mounted between said housing and the head of the connector.

12. The kit of claim 11, wherein said locking member is a hex head nut having the same diameter as said hex head fitting on said bushing.

13. A method of adjusting the lateral distance between a furrow opening disk rotatably mounted on the frame of an agricultural planting machine and a gauge wheel mounted for rotation on one end of a gauge wheel arm, comprising mounting an externally threaded bushing in the internally threaded bore at the other end of the gauge wheel arm, the externally threaded bushing axially of the internally threaded bore, mounting the bushing and gauge wheel arm on an internally threaded shaft connected to the agricultural planting machine so that the gauge wheel rotates about an axis rearwardly and generally parallel to the axis of an associated furrow opening disk, using a hex-headed externally threaded bolt extending through the externally threaded bushing and the gauge wheel arm mounted thereon to maintain the gauge wheel arm on the internally threaded shaft, and providing a plurality of shim washers between the internally threaded shaft and the hex-head of the bolt to accommodate differences in lengths of the internally threaded shafts.

\* \* \* \* \*

UNITED STATES PATENT AND TRADEMARK OFFICE
CERTIFICATE OF CORRECTION

PATENT NO. : 6,321,667 B1 Page 1 of 1
DATED : November 27, 2001
INVENTOR(S) : Kenneth E. Shoup It is certified that error appears in the above-identified patent and that said Letters Patent is hereby corrected as shown below:

Column 1,
Line 12, delete "4,111,137" and insert -- 4,009,668 --; delete "5,111,137" and insert -- 5,427,038 --.

Signed and Sealed this

Thirtieth Day of July, 2002

Attest:

JAMES E. ROGAN
Attesting Officer  Director of the United States Patent and Trademark Office